(12) United States Patent
Frazee et al.

(10) Patent No.: US 6,762,738 B2
(45) Date of Patent: Jul. 13, 2004

(54) PIXEL CIRCUIT WITH SHARED ACTIVE REGIONS

(75) Inventors: Jerome A. Frazee, Milpitas, CA (US); Russell Flack, Scottsdale, AZ (US); Joseph T. Smith, Chandler, AZ (US)

(73) Assignee: Brillian Corporation, Tempe, AZ (US)

( * ) Notice: Subject to any disclaimer, the term of this patent is extended or adjusted under 35 U.S.C. 154(b) by 237 days.

(21) Appl. No.: 09/966,310

(22) Filed: Sep. 28, 2001

(65) Prior Publication Data

US 2003/0063056 A1 Apr. 3, 2003

(51) Int. Cl.[7] ................................................ G06G 3/36
(52) U.S. Cl. ........................ 345/90; 345/92; 349/42
(58) Field of Search .............................. 345/90, 91, 92, 345/93, 98, 100, 87, 88, 89, 205, 206; 349/42, 48, 43, 52, 113, 114

(56) References Cited

U.S. PATENT DOCUMENTS

| | | | |
|---|---|---|---|
| 5,365,355 A | 11/1994 | Hastings, III et al. | |
| 5,461,501 A | 10/1995 | Sato et al. | 349/42 |
| 5,801,400 A | 9/1998 | Nishihata | 257/72 |
| 6,034,749 A | 3/2000 | Sato et al. | |
| 6,057,897 A | 5/2000 | Ichikawa et al. | 349/48 |
| 6,163,352 A | 12/2000 | Ichikawa et al. | |
| 6,181,398 B1 | 1/2001 | Libsch et al. | 349/113 |
| 6,377,322 B2 | 4/2002 | Yamaguchi et al. | 349/42 |
| 6,507,376 B2 | 1/2003 | Nakamura | 349/38 |
| 2001/0022572 A1 | 9/2001 | Murade | |
| 2003/0020846 A1 | 1/2003 | Smith et al. | 349/43 |
| 2003/0038651 A1 | 2/2003 | Zuravleff | 324/770 |
| 2003/0063055 A1 | 4/2003 | Frazee et al. | 345/87 |
| 2003/0063061 A1 | 4/2003 | Frazee et al. | 345/100 |

*Primary Examiner*—Xiao Wu
(74) *Attorney, Agent, or Firm*—Baker Botts L.L.P.

(57) ABSTRACT

An LCD pixel device is provided of the type deployed in a matrix of pixels selectively energized by a plurality of row lines and plurality of column lines and wherein a video voltage is stored on at least one pixel capacitor and coupled to an image-generating device. First and second source regions are formed near the surface of a semiconductor substrate. A drain region is likewise formed in the substrate between the first and second source regions forming the channels of first and second field-effect-transistors. An insulating layer is formed on the substrate, and first and second gate electrodes are provided in the insulating layer between the first source region and the drain region and the second source region and the drain region respectively. First and second mirrors are provided on the surface of the insulating layer. Conductive interconnects formed in the insulating layer provide electrical coupling between the first and second transistors, the first and second capacitors, and the first and second mirrors, respectively.

15 Claims, 3 Drawing Sheets

PIXEL CIRCUIT WITH SHARED ACTIVE REGIONS

TECHNICAL FIELD

This invention relates generally to a liquid crystal display (LCD), and more particularly to an LCD display utilizing miniaturized pixel cells having shared active regions.

BACKGROUND OF THE INVENTION

For many decades, the cathode ray tube (CRT) was the dominant display device creating an image by scanning a beam of electrons across a phosphor-coated screen causing the phosphors to emit visible light. The beam is generated by an electron gun and is passed through a deflection system that causes the beam to rapidly scan left-to-right and top-to-bottom. A magnetic lens focuses the beam to create a small moving dot on the phosphor screen. This rapidly moving spot of light paints an image on the surface of the viewing screen.

Light emitting diodes (LEDs) have also found a multitude of uses in the field of optoelectronics. An LED is a solid-state device capable of converting a flow of electrons into light. By combining two types of semiconductive material, LEDs emit light when electricity is passed through them. Displays comprised of LEDs may be used to display a number of digits each having seven segments. Each segment consists of a group of LEDs, which in combination can form alphanumeric images. They are commonly used in, for example, digital watch displays, pager displays, cellular handset displays, etc., and due to their excellent brightness, LEDs are often used in outdoor signs. Generally speaking, however, they have been used primarily in connection with non-graphic, low-information-content alphanumeric displays. In addition, in a low-power CMOS digital system, the dissipation of LEDs or other comparable display technology can dominate the total system's power requirements, which could substantially negate the low-power dissipation advantage of CMOS technology.

Liquid crystal displays (LCDs) were developed in the 1970s in response to the inherent limitations in the then existing display technologies (e.g. CRTs, LED displays, etc.) such as excessive size, limited useful life, excessive power consumption, and limited information content. LCD displays comprise a matrix of pixels that are arranged in rows and columns that can be selectively energized to form letters or pictures in black and white or in a wide range of color combinations. An LCD modifies light that passes through it or is reflected from it as opposed to emitting light, as does an LED. An LCD generally comprises a layer of liquid crystalline material suspended between two glass plates or between a glass plate and a substrate. A principle advantage of an LCD over other display technologies is the ability to include thousands or even millions of pixels in a single display paving the way for much greater information content.

With the shift from segmented, very low information content displays to more information-rich digital products, LCDs now appear in products throughout the communications, office automation, and industrial, medical, and commercial electronics industries. Historically, the market for small displays has demanded low cost, minimal power consumption, and high image quality. It is well known that image quality is improved as display resolution increases, and that this can be accomplished by increasing the size of the array for a fixed pixel cell size. Unfortunately, system costs increase dramatically as the diagonal length of the array increases. It is also known that the stored video voltage on each pixel cell capacitor is subject to noise signals due to capacitive coupling between adjacent rows and columns. Capacitively coupled noise signals on the pixel will result in an image which does not correctly match the stored video signal, and therefore image quality is degraded. Increasing the physical separation between the pixel cell capacitor metal interconnect and the row and column line reduces capacitive coupling but has the undesirable effect of requiring a larger pixel cell die area to maintain a fixed capacitance.

In view of the foregoing, it should be appreciated that it would be desirable to increase the display resolution of an LCD display without increasing display size. Furthermore, it would likewise be desirable to minimize unwanted capacitive coupling between each pixel cell capacitor and adjacent rows and columns. Additional desirable features will become apparent to one skilled in the art from the foregoing background of the invention and the following detailed description of a preferred exemplary embodiment and appended claims.

SUMMARY OF THE INVENTION

In accordance with the teachings of the present invention, there is provided an LCD pixel device of the type deployed in a matrix of pixels that are selectively energized by a plurality of row lines and plurality of column lines and wherein a video voltage is stored on at least one pixel capacitor and coupled to an image-generating device. First and second source regions are formed near the surface of a semiconductor substrate. A drain region is likewise formed in the substrate between the first and second source regions forming the channels of first and second field-effect-transistors. An insulating layer is formed on the substrate, and first and second gate electrodes are provided in the insulating layer between the first source region and the drain region and between the second source region and the drain region, respectively. First and second mirrors are provided on the surface of the insulating layer. Conductive interconnects formed in the insulating layer provide electrical coupling between the first and second transistors, the first and second capacitors, and the first and second mirrors, respectively.

BRIEF DESCRIPTION OF THE DRAWINGS

The present invention will hereinafter be described in conjunction with the accompanying drawings wherein like reference numerals denote like elements, in which.

DESCRIPTION OF THE PREFERRED EXEMPLARY EMBODIMENT

The following detailed description of a preferred embodiment is mainly exemplary in nature and is not intended to limit the invention or the application or use of the invention.

Figure 1:
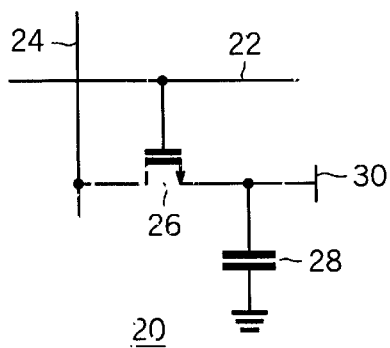
FIG. 1 is a schematic diagram of a single analog pixel cell.

FIG. 1 is a schematic diagram of an individual pixel 20 coupled to a row line 22 and a column line 24. Of course it should be understood, that an actual LCD microdisplay would include a large matrix of row lines 22, column lines 24, and pixels 20. Each pixel includes an access n-channel field-effect-transistor 26, which has a gate coupled to row line 22 and a drain coupled to column line 24. The source of access transistor 26 is coupled to a first terminal of pixel capacitor 28 and to pixel mirror 30, the function of which will be described more fully in connection with FIG. 2. The other terminal of capacitor 28 is coupled to a source of potential; e.g. ground.

Figure 2:
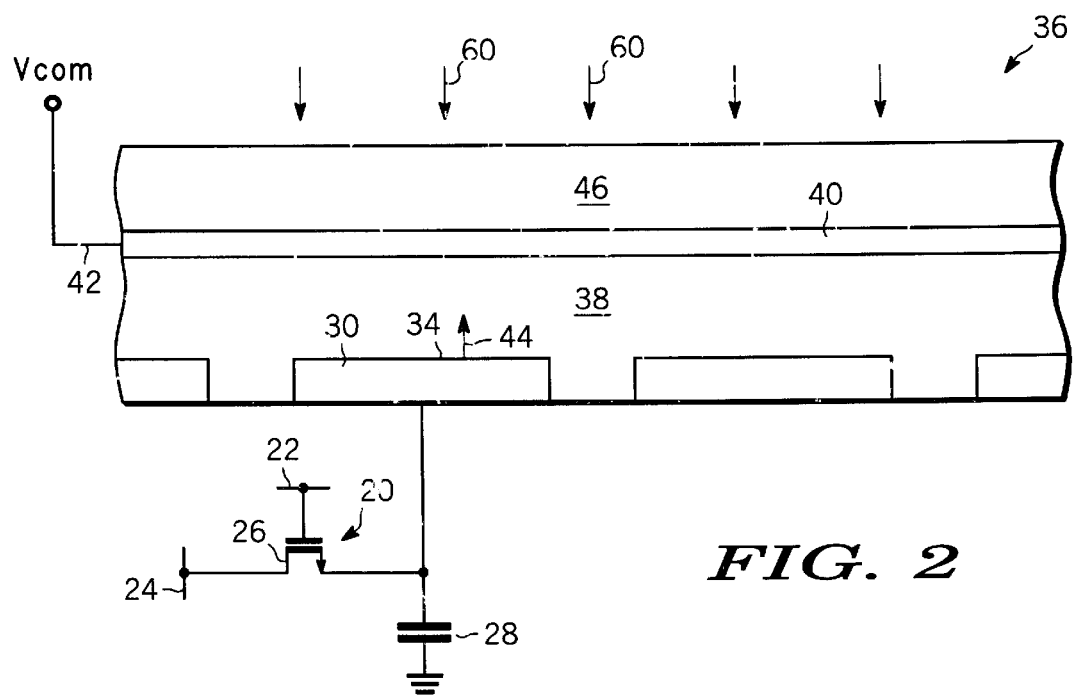
FIG. 2 is a simplified functional diagram illustrating how pixel circuitry interacts with pixel mirrors and the remainder of an LCD microdisplay.
Figure 3:
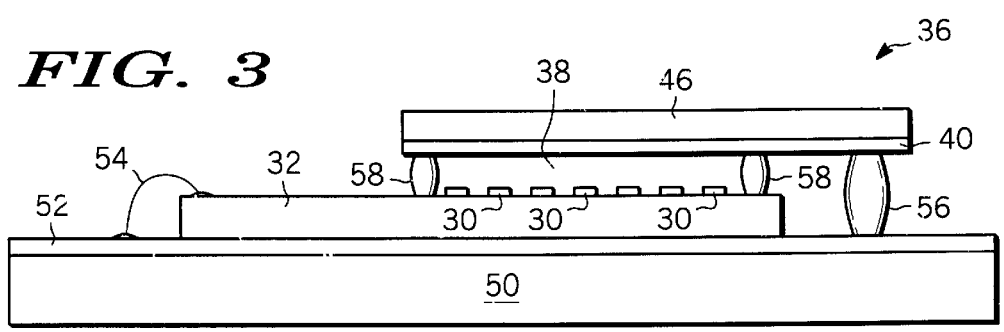
FIG. 3 is a simple cross-sectional view showing major components of an LCD microdisplay.

FIG. 2 is a simplified functional diagram illustrating how each pixel 20 interacts with an associated mirror 30 to create a liquid crystal image. FIG. 3 is a simplified cross-sectional view of a liquid crystal display that likewise will be useful in explaining the operation of a liquid crystal display. In both cases, like reference numerals denote like elements. Referring to both FIG. 1 and FIG. 2, pixel 20, described in connection with FIG. 1, is again shown coupled to mirror 30, a plurality of which reside on the surface of a semiconductor substrate (e.g. silicon) 32 as is shown in FIG. 3. Mirrors 30 may be metallic (e.g. aluminum) and have a thickness of, for example, 2000 angstroms, and each has a reflective surface 34 that may or may not have enhanced reflective properties. When row line 22 is asserted, transistor 26 becomes conductive, thus permitting the video signal (e.g. a analog video signal) appearing on column line 24 to charge pixel capacitor 28. Thus, the voltage on mirror 34 will vary in accordance with the voltage across pixel capacitor 28. Located within region 38 is a liquid crystal material, the molecules of which orient themselves in a relationship that depends on the voltage applied thereacross. A glass seal 46 is provided under which a layer of indium-tin-oxide (ITO) 40 is provided which is a transparent conductive material to which a potential $V_{com}$ is applied as is shown at 42. $V_{com}$ may, for example, be approximately 7 volts. The voltage stored across pixel capacitor 28 and therefore the voltage on mirror 34 may approach a much higher voltage (e.g. 17–18 volts) thus placing a significant potential difference between mirror 34 and ITO layer 40 and causing the molecules of the liquid crystal material in region 38 to assume a first orientation corresponding to black. Alternatively, if the voltage stored across pixel capacitor 28 is low, thus reducing the potential difference between mirror 30 and ITO layer 40, the molecules of the liquid crystal material in region 38 will assume a different orientation (e.g. corresponding to white). That is, a high voltage on mirror 30 may cause the molecules of the liquid crystal material to substantially prevent light (indicated by arrow) 44 from being reflected from mirror surface 34 while a lower voltage on mirror 30 will permit light 44 to be reflected.

Mirrors 30 reside on the surface of a semiconductor substrate (e.g. silicon) 32, which has deposited therein or formed thereon all the active regions (e.g. pixel capacitors, access transistors, etc.) required to produce a working device. Semiconductor die is supported by a substrate 50 (e.g. ceramic) which may have a flexible printed circuit board 52 disposed thereon for the purpose of making external connection to semiconductor die 32 and ITO layer 40 by, for example, wire bond 54 and conductive epoxy crossover 56. Finally, a perimeter seal 58 is provided between the surface of semiconductor dye 32 and the surface of ITO layer 40 to seal the liquid crystal material within region 38.

In operation, ambient or generated light (indicated by arrows 60) impinges upon and passes through transparent glass layer 46 and ITO layer 40. If the potential difference between mirror 30 and ITO layer 42 is high, virtually no light will be reflected from surface 34 of mirror 30 and therefore that portion of the video image created by pixel 20 will approach black. If, on the other hand, the potential difference between mirror 30 and ITO layer 42 is very low, virtually all of the light 60 striking surface 34 will be reflected and that portion of the video image to be created by pixel 20 will approach white. It should be clear that between these two extremes, there are a multiple of shades extending from white to black, which may be displayed depending on the magnitude video voltage stored on pixel capacitor 28 and applied to mirror 30. Since the operation and structure of liquid crystal microdisplays is well known and well documented in technical literature. For example, see U.S. Pat. No. 3,862,360 entitled "Liquid Crystal Display System With Integrated Signal Display Storage Circuitry" issued Jan. 21, 1975 and assigned to Hughes Aircraft Company, the teachings of which are hereby incorporated by reference.

Figure 4:
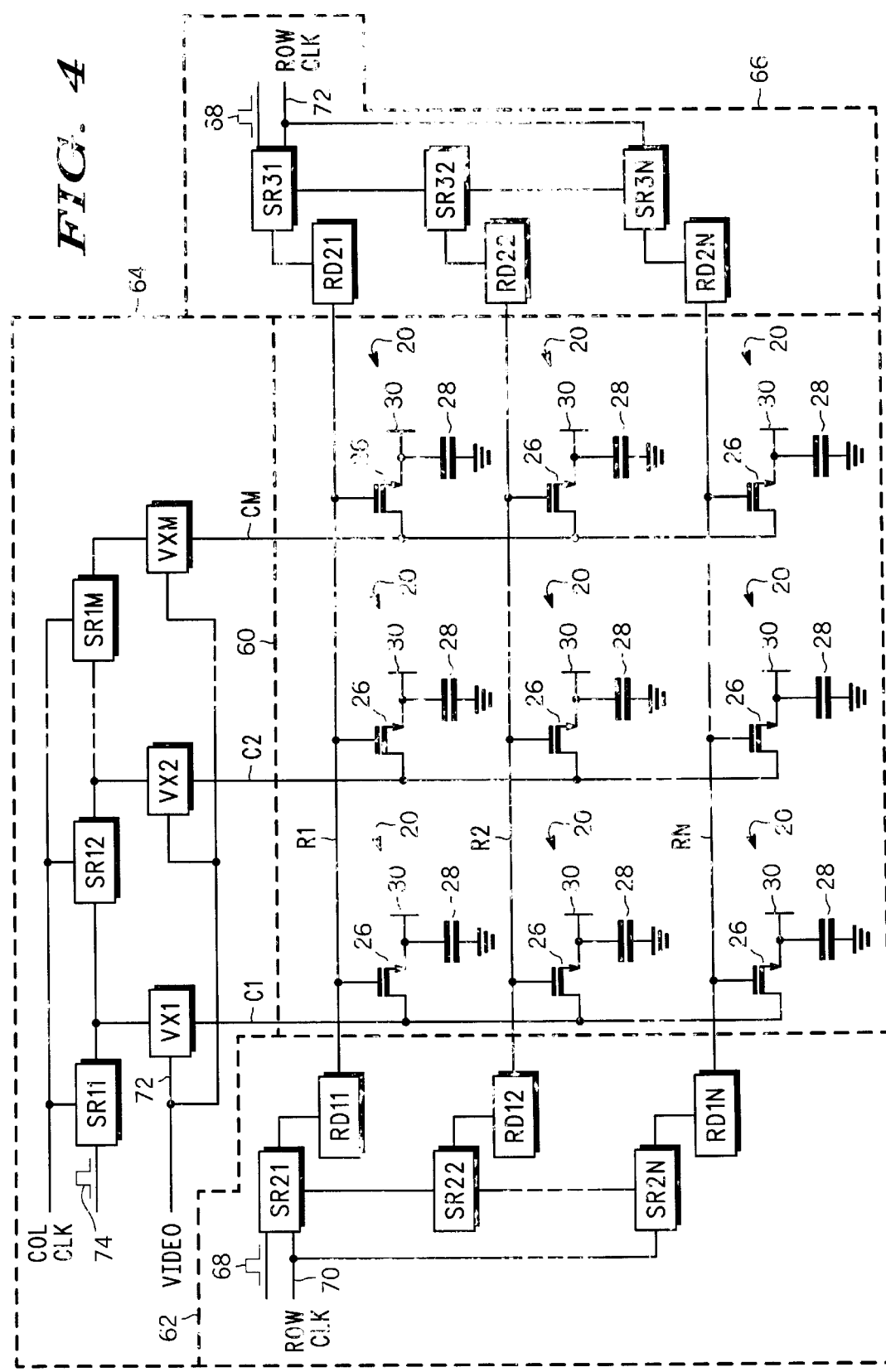
FIG. 4 is a partial schematic/partial block diagram of an N×M LCD display utilizing video switches in accordance with the present invention.

FIG. 4 is a partial schematic/partial block diagram of an N×M LCD microdisplay utilizing video switches in accordance with the teachings of the present invention. As can be seen, the apparatus of FIG. 4 comprises an N×M matrix 60 of video pixels 20 (only several of which are shown for clarity), a plurality of rows R1, R2, ..., RN, and a plurality of columns C1, C2, ..., CM. The apparatus also includes a first row select circuit 62, a first column select circuit 64 and optionally a second row select circuit 66. Row select circuit 62 includes a shift register containing bits SR21, SR22, ..., SR2N, the output of each of which is respectively coupled to a plurality of row drivers RD11, RD12, ... RD1N. Similarly, column select circuit 64 includes a serial shift register comprised of bits SR11, SR12, ..., SR1M each having outputs coupled respectively to video switches VX1, VX2, ..., VXN.

As is well known in the art, the pixels coupled to the columns and rows are scanned in order to create an LCD image. The following is one example of how this scanning process is accomplished. Starting with row select circuitry 62, shift register bit SR21 has a signal 68 applied to an input thereof. Under the control of a row clock applied to the clock input 70 of bit SR21 and to the clock inputs of each successive stage SR22, ..., SR2N, signal 68 is propagated through the shift register. The output of each shift register bit is coupled to a corresponding row driver RD11, RD12, ..., RD1N each of which is sequentially energized as signal 68 propagates through the bits of the shift register. This process in turn sequentially asserts rows R1, R2, ..., RN.

Column select circuit 64 likewise comprises a shift register comprised of shift register bits SR11, SR12, ..., SR1M each of which has an output coupled respectively to a plurality of column video switches VX1, VX2, ..., VXM. The output of each video switch VX1, VX2, ..., VXM is coupled respectively to columns C1, C2, ..., CM. Each video switch also has an input for receiving the video signal to be displayed as is shown at 72. A pulse signal 74 is applied to the input of the first shift register bit SR11, and through the action of a column clock which is applied to the clock inputs of each of the shift register bits SR11, SR12, ..., SR1M, pulse 74 is serially clocked through successive bits of the shift register. Thus, each of the video switches VX1, VX2, ..., VXM each has an input which is respectively coupled to a corresponding output of a shift register bit for sequentially applying the video signal appearing at 72 to each of the column lines C1, C2, . . . , CM.

If desired, a second row select circuit 66 may be provided to drive the row lines at their opposite ends in order to provide a greater drive capacity. Circuit 66 includes a shift register comprised of stages SR31, SR31, . . . , SR3M and a plurality of row drivers RD21, RD22, . . . , RD2N. SR31 receives the same input signal 68 and row clock at 72 so as to operate synchronously with row select circuit 62. Thus, instead of driving the matrix rows from only one end and propagating the drive signal down the entire row, each row is driven at both ends to improve performance.

Figure 5:
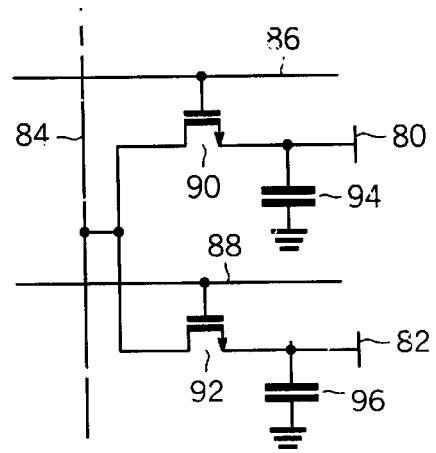
FIG. 5 is a schematic diagram of two adjacent pixel cells in accordance with the teachings of the present invention.

As stated previously, it would be desirable to increase display resolution without increasing display size and to limit unwanted capacitive coupling between the pixel cell capacitor and adjacent rows and columns without sacrificing die area. FIG. 5 is a schematic diagram of two adjacent pixel cells in accordance with the teachings of the present invention. The first pixel cell comprises access n-channel field-effect-transistor 90, capacitor 94 and mirror 80. Field-effect-transistor 90 has a gate coupled to row line 86 and a source coupled to a first terminal or capacitor 94 which has a second terminal for coupling to a potential (e.g. ground). As can be seen, capacitor 94 is coupled to a first mirror 80. Similarly, n-channel field-effect-transistor 92 has a gate coupled to row line 88 and a source coupled to a first terminal of capacitor 96 which has a second terminal for coupling to a potential (e.g. ground). Capacitor 96 is coupled to mirror 82. It should be noted that the drains of both transistors 90 and 92 are coupled in common and to column line 84. It is this feature that helps achieve the desired miniaturization which in turn enables an increase in display resolution without an increase in display size, as will be more fully explained in connection with FIG. 6.

Figure 6:
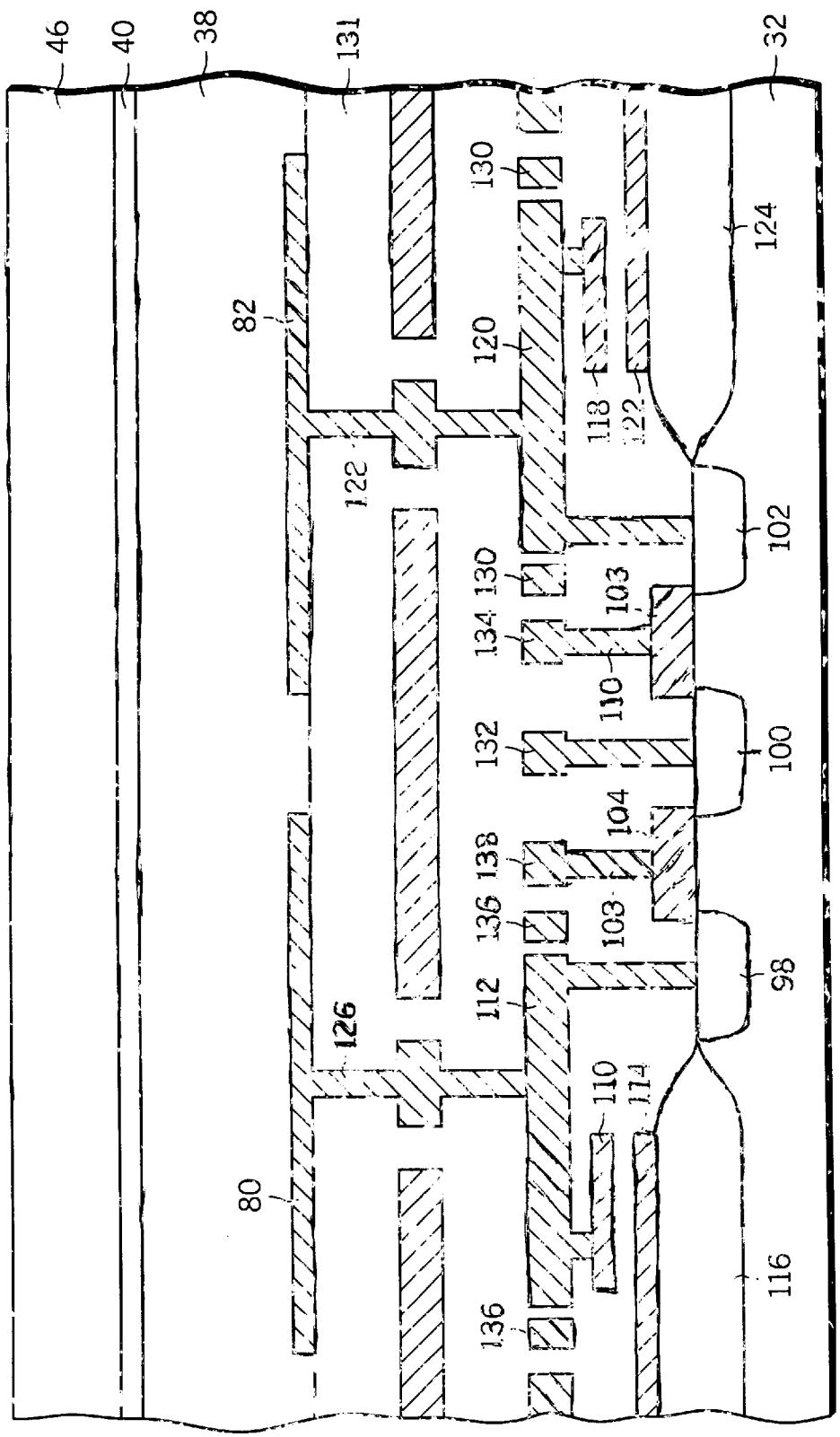
FIG. 6 is a cross-sectional view of a portion of an LCD display illustrating the use of adjacent NMOS access transistors having a shared drain and pixel video guard rings in accordance with the teachings of the present invention.

FIG. 6 is a cross-sectional view of a portion of an LCD display wherein adjacent access transistors share a common drain region. Referring to FIG. 6, there is shown a semiconductor substrate (e.g. p-doped silicon) into which n-doped regions 98, 100 and 102 are formed. Region 98 corresponds to the source of transistor 90, region 102 corresponds to the source of transistor 92, and region 100 corresponds to the common drain of transistors 90 and 92 as shown in FIG. 5. A gate electrode 104 is formed on the surface of substrate 32 in the region between source region 98 and drain region 100 forming a channel therebetween. Similarly, gate electrode 106 is formed on the surface of substrate 32 between source region 102 and drain region 100 forming a channel therebetween. Gate 104 is coupled to a first row line 86 (FIG. 5) via metal interconnect 108, and gate 106 is coupled to a second row line 88 via metal interconnect 110. Gates 104 and 106 and interconnects 108 and 110 are formed in an insulating layer deposited on substrate 32 made of, for example, a silicon oxide (e.g. silicon dioxide).

Source region 98 is likewise electrically coupled to a first plate 110 and top electrode of a polysilicon capacitor via metal interconnect 112. The second plate 114 and bottom electrode of the polysilicon capacitor is formed on the surface of field oxide 116 (e.g. silicon dioxide). In like fashion, source region 102 is coupled to a first plate 118 of a second polysilicon capacitor via metal interconnect 120. The second plate 122 resides on a region 124 of field oxide (e.g. silicon dioxide). Capacitor plate 110 is coupled to mirror 80 formed on insulating layer 131 via metal interconnect 112 and metal connect 126. In a similar fashion, capacitive plate 118 is electrically coupled to mirror 82 formed on insulating layer 131 via metal interconnect 120 and metal interconnect 128. Mirrors 80 and 82 reside in a region 38 occupied by a liquid crystal material as shown and described in connection with FIG. 2 and FIG. 3. Glass lens 46 is formed on ITO layer 40 to form the upper boundary of the liquid crystal material as was also described in connection with FIG. 2 and FIG. 3.

Thus, a first access transistor (90 in FIG. 5) is formed by source region 98, drain region 100, and gate 104, and a second access transistor (92 in FIG. 5) is formed by source 102, drain 100 and gate 106. The source of the first transistor (P-type region 98) is coupled to a video storage capacitor (94 in FIG. 5) formed by plates 110 and 114, which are in turn coupled to pixel mirror 80. In a similar fashion, the second access transistor (92 in FIG. 5) is coupled to a video storage capacitor (96 in FIG. 5) formed by plates 118 and 122, which are in turn coupled to mirror 82. Through the use of a common drain region, die area is saved and the number of pixels may be increased, thereby increasing display resolution without increasing display size.

To limit the capacitive coupling between the pixel cell capacitors and the adjacent rows and columns, a guard ring electrically connected to the ground potential 130 encircles metal interconnect 120 thereby electrically isolating it from adjacent column line 132 and adjacent row line 134. Similarly, a guard ring 136 encircles interconnect 112 to isolate it from column line 132 and row line 138. This helps reduce the occurrence of noise signals on pixel cell capacitors due to the capacitive coupling between the pixel capacitors and adjacent rows and column signal lines.

From the foregoing description, it should be appreciated that an arrangement has been provided wherein two adjacent pixel cells share a common drain region. This results in a reduction in the amount of die area that would be required if each pixel access transistor had a separate drain region. Furthermore, since the metal interconnects contacting the video storage capacitors are protected by grounded guard rings, the amount of noise on the pixel cell capacitors due to capacitive coupling between the capacitors and adjacent rows and columns is reduced.

While a preferred exemplary embodiment has been presented in the foregoing detailed description, it should be appreciated that a vast number of variations in the embodiments exist. It should also be appreciated that this preferred embodiment is only an example and is not intended to limit the scope, applicability or configuration of the invention in any way. Rather, the foregoing detailed description provides those skilled in the art with a convenient roadmap for implementing the preferred exemplary embodiment of the invention. Various changes may be made in the function and arrangement described above without departing from the spirit and scope of the invention as set forth in the appended claims.

What is claimed is:

1. An LCD pixel device of the type deployed in a matrix of pixels selectively energized by a plurality of row lines and a plurality of column lines and wherein a video voltage is stored on at least one pixel capacitor coupled to an image-generating device, comprising:

a substrate having a first surface;

first and second source regions formed on said substrate proximate said first surface;

a drain region formed on said substrate proximate said first surface and between said first and second source regions forming a first channel of a first field-effect-transistor between said first source region and said drain region and forming a second channel of a second field-effect-transistor between said second source region and said drain region;

an insulating layer having a second surface formed on said first surface;

first and second gate electrodes formed in said insulating layer proximate said first channel and said second channel respectively and coupled to first and second ones respectively of said plurality of row lines;

a drain electrode formed in said insulating layer and coupled to one of said plurality of column lines;

first and second capacitors formed in said insulating layer;

first and second mirrors formed on said second surface;

first and second interconnects formed in said insulating layer for providing electrical coupling between said first source region, said first capacitor, and said first mirror, and between said second source region, said second capacitor, and said second mirror, respectively.

2. An LCD pixel device according to claim 1 wherein said substrate is a p-doped silicon substrate.

3. An LCD display according to claim 2 wherein said first and second source regions are n-doped silicon.

4. An LCD display according to claim 3 wherein said drain region is n-doped silicon.

5. An LCD display according to claim 4 wherein said insulating layer is silicon dioxide.

6. An LCD display according to claim 5 wherein said first and second capacitors are polysilicon capacitors.

7. An LCD display according to claim 6 wherein said first and second mirrors are aluminum.

8. An LCD pixel device according to claim 7 wherein said first and second interconnects are aluminum.

9. An LCD pixel device according to claim 1 further comprising first and second guard rings deployed around said first and second interconnects, respectively.

10. An LCD display for generating an image of a video signal, said LCD display being of the type which included a matrix pixels arranged in a plurality of rows and a plurality of columns which are selectively energized to create said image, comprising:

at least first and second row lines;

at least one column line;

a substrate having a first surface;

first and second source regions formed in said substrate proximate said first surface;

a drain region formed in said substrate proximate said first surface and between said first and second source regions forming a first channel of a first field-effect-transistor between said first source region and said drain region and forming a second channel of a second field-effect-transistor between said second source region and drain region;

an insulating layer formed on said first surface;

first and second gate electrodes formed in said insulating layer proximate said first channel and said second channel, respectively, and coupled to said at least first and second row lines, respectively;

a drain electrode formed in said insulating layer and coupled to said at least one column line;

first and second capacitors formed in said insulating layer;

first and second mirrors formed on said second surface;

first and second interconnects formed in said insulating layer for providing electrical coupling between said first source region, said first capacitor, and said first mirror, and between said second source region, said second capacitor, and said second mirror, respectively.

11. An LCD display according to claim 10 wherein said substrate is a p-doped silicon.

12. An LCD display according to claim 11 wherein said first and second source regions and said drain regions are a n-doped silicon.

13. An LCD display according to claim 12 wherein said first and second capacitors are polysilicon capacitors.

14. An LCD display according to claim 13 wherein said first and second mirrors are aluminum.

15. An LCD display according to claim 10 further comprising first and second guard rings deployed around said first and second interconnects, respectively.

* * * * *